United States Patent [19]
Pecorella et al.

[11] 3,834,226
[45] Sept. 10, 1974

[54] DISPOSABLE TEMPERATURE INDICATOR

[75] Inventors: Saviour S. Pecorella, Howard Beach, N.Y.; Robert Shotkin, Milburn, N.J.

[73] Assignee: Becton, Dickinson and Company, East Rutherford, N.J.

[22] Filed: May 10, 1973

[21] Appl. No.: 359,196

Related U.S. Application Data

[63] Continuation-in-part of Ser. No. 171,888, Aug. 16, 1971, abandoned.

[52] U.S. Cl. ............. 73/150 A, 116/106, 116/114.5
[51] Int. Cl. ......................................... G01n 19/04
[58] Field of Search ............... 116/114.5, 106, 159; 73/358, 368.3, 95, 150 A, 88 B; 340/232; 128/24

[56] References Cited
UNITED STATES PATENTS

| | | | |
|---|---|---|---|
| 945,978 | 1/1910 | Nelsen et al. | 116/114.5 |
| 1,885,209 | 11/1932 | Loester | 73/159 |
| 1,951,650 | 3/1934 | Diack | 116/114.5 |
| 2,058,288 | 10/1936 | Bamonte | 116/114.5 X |
| 2,362,424 | 11/1944 | Walsh | 116/114.5 |
| 2,473,517 | 6/1949 | Freedman | 73/150 A |
| 3,175,401 | 3/1965 | Geldmacher | 116/114.5 X |
| 3,382,840 | 5/1968 | Pabst | 73/358 X |
| 3,688,582 | 9/1972 | Gradishar | 73/371 |

*Primary Examiner*—Richard C. Queisser
*Assistant Examiner*—Daniel M. Yasich
*Attorney, Agent, or Firm*—Kane, Dalsimer, Kane, Sullivan and Kurucz

[57] ABSTRACT

An irreversible and disposable temperature-indicating device, such as but not restricted to one capable of being inserted into and of indicating the temperature of a living body. The device contains one or more heat-responsive materials preferably disposed as a film situated between and adhering to each of a pair of separable members, so arranged that each pair of separable members is capable of being pulled apart by a predetermined force at a predetermined temperature prior to melting of the material. The resulting separation is used directly or indirectly to provide indication that the predetermined temperature has been attained.

6 Claims, 2 Drawing Figures

PATENTED SEP 10 1974  3,834,226

INVENTORS
SAVIOUR S. PECORELLA
ROBERT SHOTKIN

DISPOSABLE TEMPERATURE INDICATOR

CROSS REFERENCE TO OTHER APPLICATIONS

The present application is a continuation-in-part of presently pending application Ser. No. 171,888, filed Aug. 16, 1971, now abandoned.

BACKGROUND OF THE INVENTION

1. Field of the Invention

This invention relates to disposable temperature indicators and more particularly to an irreversible temperature indicator for indicating fever in humans.

2. Description of the Prior Art

Heretofore temperature indicators have been provided using fusible materials in one of two ways. Firstly, indicators have been provided using a fusible material where the indication was merely visual such as by the observation of a change of phase such as the change from a solid to a liquid, by a change of transparency or by the appearance of color caused by dissolution of a dye in a melted material. These devices tended to be sluggish and provided a delayed temperature indication due to the manner in which they employed the heat responsive material. In order for those devices to produce an unmistakable indication that a temperature had been reached, a substantial portion of the fusible material had to melt. Thus, it was required that a sufficient quantity of heat be absorbed into the solid material to raise it from its initial temperature to the temperature of melting and that an additional quantity of heat be provided to completely overcome the latent heat of fusion of the material which in most cases is a relatively large quantity of heat.

Secondly, another form of temperature indicator provided by the prior art provided a physical indication that a particular temperature had been reached. Devices of this type usually provided two relatively movable members wherein one member was subjected to a spring exerted force urging it to move relative to the other member; however, movement was prevented by the existence of an obstruction in the form of a mass of fusible material. These devices generally had the same disadvantage as the devices that provided visual indications that a particular temperature had been reached. Namely, the indication was sluggish because of the time delay involved in absorbing sufficient heat to completely melt the mass of material forming the obstruction. Other prior art devices included members that were connected by blocks of fusible material, said members were subject to a spring tension and separated when the block of fusible material melted. Again the temperature indication was sluggish due to the mass of fusible material used and the large quantity of heat required to overcome the latent heat of fusion. Also, these devices were inaccurate because the exact force or tension being exerted on the fusible material was not known because of the use of uncalibrated springs that were held in compressed or extended position over long periods of storage time causing the force exerted by these springs to vary.

Most prior art fever thermometers were difficult to read and their accuracy was therefore dependent upon the visual acuity of the user and was also subject to a degree of interpretation by the user. This made it almost impossible for many elderly people to check their own body temperature.

Another disadvantage of all prior art irreversible disposable temperature indicators was the need for temperature controlled storage. The devices would react automatically if a predetermined temperature was exceeded. Refrigeration was usually required making such devices impractical and unacceptable.

SUMMARY OF THE INVENTION

The present invention contemplates a disposable and irreversible temperature indicator for providing a physical indication that a predetermined temperature has been attained. The indicator reacts quickly to the temperature to which it is exposed and provides an indication as to whether a particular temperature has been exceeded. The invention contemplates embodiments which utilize films of fusible materials such as mixtures of normal paraffins to bond together one or more pairs of separable members. The strength of the bond created by the fusible material varies in an inverse relationship with the temperature to which it is exposed prior to the melting point of the material being reached. Thus, for a connection of known dimensions the force required to break the connection at a particular temperature may be determined.

Mixtures of certain paraffins provide an excellent bonding material because their melting points are in a temperature range compatible with the temperature of a human body. The speed of the temperature indication is enhanced by the use of a film rather than a large mass of material as used in the devices of the prior art. The choice of an organic material such as a normal paraffin has the additional advantage that the material is not harmful to human beings should it accidentally come in contact with the patient or be swallowed by the patient.

One embodiment of the invention contemplates the use of a calibrated spring which is normally in a relaxed position and just prior to use is connected to exert a known force on the bonding material. The use of a calibrated spring increases the accuracy of the temperature indication and the accuracy is further enhanced by connecting the spring just prior to use so that the calibration of the spring does not change during long periods of storage.

A second embodiment of the present invention contemplates the use of a frangible connection in series with the connection formed by the fusible material. The frangible connection is calibrated to fracture under the application of a force slightly greater than that required to break the connection made by the fusible material at a predetermined fever temperature. After the device has been exposed to a temperature for a short duration, the user of the device exerts equal forces simultaneously on both the frangible connection and on the connection formed by the fusible material. If the temperature to which the device is exposed is above the predetermined fever temperature, the fusible connection breaks rather than the frangible connection. Conversely, if the predetermined temperature has not been attained, the frangible connection will fracture rather than the connection formed by the fusible material.

Thus, the present invention provides a positive physical indication that a fever exists in a patient and is not subject to interpretation by or the visual acuity of the person using the device.

The primary objective of the present invention is to provide an inexpensive, disposable irreversible temperature indicator.

Another objective of the present invention is to provide an irreversible temperature indicator that provides a physical indication that a predetermined temperature has been exceeded.

Another objective of the present invention is to provide a temperature indicator that responds quickly and accurately to a predetermined temperature.

Another objective of the present invention is to provide a temperature indicator that does not require refrigeration during shipment or storage.

Another objective of the present invention is to provide a temperature indicator that utilizes non-toxic temperature sensitive organic chemicals.

Another objective of the present invention is to provide a temperature indicator that is not subject to the visual acuity of a user.

The foregoing objectives and advantages of the invention will appear more fully hereinafter from a consideration of the detailed description which follows, taken together with the accompanying drawing where two embodiments of the invention are illustrated by way of example. It is to be expressely understood, however, that the drawing is for illustrative purposes only and is not to be considered as defining the limits of the invention.

DESCRIPTION OF THE INVENTION

Figure 1:
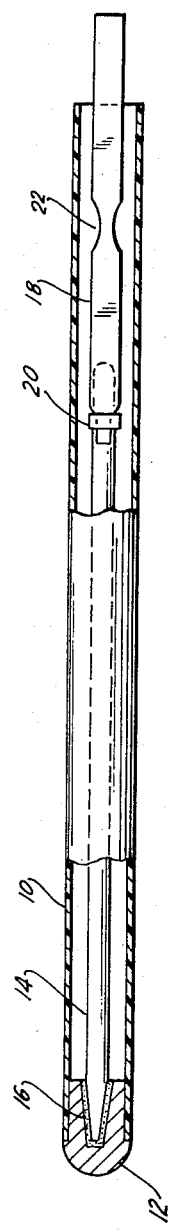
FIG. 1 is a partial sectional view of a temperature indicator constructed in accordance with the present invention.

Referring to FIG. 1, there is shown a hollow tube 10 formed of polypropylene or other suitable material having any convenient length consistent with the ultimate use of the device. An aluminum tip insert 12 is inserted in a first end of tube 10. The aluminum tip insert has an opening formed therein that is partially tapered at an angle from an axis through the center of the tube. A plug 14 has an end tapered at an angle corresponding to the taper of insert 12. Plug 14 is disposed within tube 10 so that the tapered end of the plug fits within the tapered opening formed within aluminum tip insert 12. The tapered surfaces of plug 14 and tip insert 12 are bonded together by a film 16 of a fusible material, the characteristics of which will be discussed subsequently. A strip of foil 18 such as aluminum is connected to the end of plug 14 opposite the tapered end by the use of a small piece of cellophane tape 20. Foil 18 has a length sufficient to protrude out of the end of tube 10 opposite insert 12. A notch 22 is formed in foil 18 so as to provide a frangible section of the foil that is designed to fail when a tension of about 20 grams is applied thereto.

Film 16 may be comprised of almost any feasible material; however, it is preferred, for use in humans or animals, that the material be one having non-toxic characteristics to avoid injury or discomfort to the patient.

Tests were conducted with certain paraffin hydrocarbons known as alkanes to determine the strength of bonds formed by such hydrocarbons. It was determined that if sufficient force is applied to a joint of given dimensions, rupture could result at any temperature up to the point of incipient melting of the fusible materials, and it was not necessary for visible melting to occur in advance of bond rupture. A mixture of normal paraffins was chosen that had a melting temperature slightly above the temperature to be sensed by the temperature indicator. Since the device operates below the melting point, the inherent sluggishness of devices that are dependent upon melting is eliminated. from the temperature indicator of this invention. There is no need for the absorption of sufficient heat to overcome the latent heat of fusion since it is not required that the fusible material actually melt.

The strength of bond produced by some purified normal alkanes decreases almost linearly as the temperature is increased to about 10 Fahrenheit degrees below the point of incipient melting. On further heating, the bond strength falls more sharply until a maximum rate of decrease is attained at about one-half of a Fahrenheit degree before melting begins. Within one-half degree of the point of incipient fusion the bond strength continues to decrease linearly at a maximum rate. Therefore, the last half degree region prior to incipient fusion was chosen as the predetermined temperature at which plug 14 and tip insert 12 would separate with the application of a specified force. Of course, the invention could be practiced in a different region of the strength vs. temperature curve but the preferred region is within one-half degree of incipient fusion because it provides the finest indicator sensitivity possible. The precision of indication in the one-half degree region is within one-tenth of a Fahrenheit degree compared with the precision of a conventional mercury in glass thermometer which is about two-tenths of a Fahrenheit degree.

The fusible materials preferred may be either n-eicosane or n-docosane whose purity is of the order of 99.95 mol per cent, or blends thereof having generally intermediate fusion temperatures. However, it is to be understood that other fusible materials may be used to practice this invention and that such materials are within the scope of this invention.

The device shown in FIG. 1 may be used by inserting the end having the tip insert 12 beneath the tongue of the patient for a period of time preferably three minutes. The test for fever is conducted while the device remains in the patient's mouth and it is accomplished by pulling on the protruding end of foil 18 while the tube is restrained in the patient's mouth by any convenient means such as by the lips, teeth or a hand thereby exerting a force on the film 16 and the frangible section 22 of foil 18. If the film is subjected to a temperature equal to or higher than the predetermined temperature, it will lose strength and will fracture under the application of force indicating that the predetermined temperature has been exceeded. If the predetermined temperature has not been reached, the film 16 will retain its strength and the frangible section 22 will fracture instead indicating that the patient does not have a fever. The device is not restricted to oral use but may be used in any manner typical of the mercury in glass type of clinical thermometer.

Figure 2:
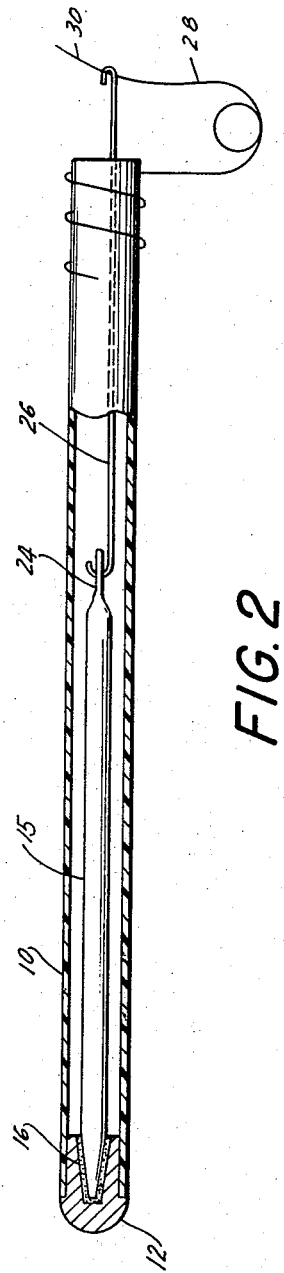
FIG. 2 is a partial sectional view of another embodiment of a temperature indicator constructed in accordance with the present invention.

Since it is necessary that the force be applied while the device is subjected to the patient's temperature, a second embodiment is provided as shown in FIG. 2. The device shown in FIG. 2 includes tube 10, insert tip 12 and a plug 15 having the same characteristics as the components used in the embodiment shown in FIG. 1. Likewise, the plug 15 is connected to tip 12 at one end by a film 16 of fusible material. The opposite end of plug 15 includes a flat portion 24 having a hole formed therein. A linkage 26 formed of a thin gauge wire has a hook formed at each end thereof. One hook is placed through the hole formed in flat end 24 of plug 15 and the other hook protrudes out of the tube 10. A spring wire 28 is attached to the end of tube 10 through which linkage 26 protrudes. The spring wire 28 is bent so as to exert 20 grams force on linkage 26 when a free end 30 of spring wire 28 is in engagement with the protruding end of linkage 26. During storage and prior use, the free end 30 of spring wire 28 is not engaged with the linkage 26 and remains in a relaxed position so that the spring wire is not deformed during storage and so that it provides a calibrated force of 20 grams when connected to linkage 26.

The procedure for using the device shown in FIG. 2 requires that the spring end 30 be engaged with the end of linkage 26 just prior to placing the device beneath the tongue of a patient. The device should remain in the patient's mouth for at least three minutes during which time the temperature of tip 12 and of the film 16 increases to the temperature of the patient. During this period the spring constantly exerts a force on the film so that upon its reaching a predetermined fever temperature the bond is fractured and plug 15 automatically pops up to provide an indication that the patient has a fever condition. Spring wire 28 retains plug 15 separated from tip 12 so that the tapered surfaces of plug 15 and tip 12 may not be again bonded should the temperature decrease.

It is to be noted that the strength of the bond formed by the film of fusible material is dependent upon the temperature of the fusible material and also upon the dimensions of the joint formed. Therefore, it is particularly significant that the joint is formed between the tapered surfaces of the plug and tip 12 so as to define a joint having a specific area and thereby provide uniformity amongst the devices produced. It is apparent that other types of joints having a specific area but differing in geometry from the illustrated embodiments, may be constructed and that such other types are within the intent of the present invention. By forming the joint between tapered surfaces, the joint area is maximized without enlarging the overall diameter of the device and without suffering from the sluggish separation that results when the joint is formed between cylindrical surfaces.

The present invention provides an inexpensive, disposable temperature indicator which utilizes a nontoxic temperature sensitive material to provide a quick and accurate indication that a specified temperature has been exceeded. The device need not be refrigerated during shipment or storage and is not subject to the visual acuity or judgment of the user since the device provides a positive physical indication that a predetermined temperature has been exceeded.

Having thus described the invention, what is claimed is:

1. A device for providing an indication that a predetermined temperature has been exceeded comprising:

a first member;
a second member;
fusible bonding material having a melting point above said predetermined temperature forming a connection of known area between the first and second members, said bonding material being such that the force required to separate the members at the connection is a function of temperature at said predetermined temperature; and,
means on one of said members for limiting to a predetermined maximum the force applied to said one member which can be transmitted through said one member to the connection whereby the members separate at the connection while a force less than but approaching the predetermined maximum force is applied to said one member and simultaneously the connection is subjected to a temperature thereby indicating that the predetermined temperature has been exceeded exceeding said predetermined temperature.

2. The device in accordance with claim 1 wherein said first member includes a tapered opening therein, said second member has an end tapered at an angle corresponding to the angle of said tapered opening whereby said second member end can seat in said opening, and said bonding material is disposed in a film between said first member opening and second member tapered end seated in said opening.

3. A device as described in claim 1, wherein the means for applying a predetermined force comprises a frangible section operatively associated with said one of said first and second members calibrated to break at a predetermined force so that a force slightly less than the predetermined force is exerted on the bonding material, so that if the frangible section fractures, it is an indication that the predetermined temperature has not yet been attained.

4. A device as described in claim 3, wherein the bonding material comprises a normal paraffin.

5. A device as described in claim 3, wherein the frangible section comprises a flexible material attached to said one of said first and second members and having a notch formed therein.

6. A device as described in claim 5, wherein the flexible material comprises a thin strip of foil.

* * * * *